US012105798B2

(12) United States Patent
Boucadair et al.

(10) Patent No.: US 12,105,798 B2
(45) Date of Patent: Oct. 1, 2024

(54) METHOD FOR COORDINATING THE MITIGATION OF A CYBER ATTACK, ASSOCIATED DEVICE AND SYSTEM

(71) Applicant: Orange, Issy-les-Moulineaux (FR)

(72) Inventors: Mohamed Boucadair, Chatillon (FR); Christian Jacquenet, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 311 days.

(21) Appl. No.: 17/780,266

(22) PCT Filed: Nov. 26, 2020

(86) PCT No.: PCT/FR2020/052194
§ 371 (c)(1),
(2) Date: May 26, 2022

(87) PCT Pub. No.: WO2021/105626
PCT Pub. Date: Jun. 3, 2021

(65) Prior Publication Data
US 2022/0414211 A1 Dec. 29, 2022

(30) Foreign Application Priority Data
Nov. 29, 2019 (FR) ...................................... 1913501

(51) Int. Cl.
*H04L 9/40* (2022.01)
*G06F 21/55* (2013.01)
*H04L 29/06* (2006.01)

(52) U.S. Cl.
CPC ...... *G06F 21/554* (2013.01); *G06F 2221/034* (2013.01)

(58) Field of Classification Search
CPC ........................................................ G06F 21/54
(Continued)

(56) References Cited

U.S. PATENT DOCUMENTS 9,390,285 B1    7/2016  Dolas et al.
9,762,610 B1 *  9/2017  Kwan ..................... H04L 63/20
(Continued)

FOREIGN PATENT DOCUMENTS

WO    2016014593 A1    1/2016

OTHER PUBLICATIONS

International Search Report dated Feb. 16, 2021 for corresponding International Application No. PCT/FR2020/052194, Nov. 26, 2020.
(Continued)

*Primary Examiner* — Haresh N Patel
(74) *Attorney, Agent, or Firm* — David D. Brush; Westman, Champlin & Koehler, P.A.

(57) ABSTRACT

A method for coordinating mitigation of a cyber attack, an associated device and system. The coordination method is implemented by a device managing resources in a computing domain, wherein the resources are protected by a plurality of services protecting against cyber attacks. The method includes: producing mitigation plans implemented by protection services from the plurality of protection services in response to a cyber attack targeting at least one of the resources in the computing domain; and following a detection of at least one incompatibility between the mitigation plans produced, coordinating an adjustment to all or some of the incompatible mitigation plans, among the protection services that have implemented the incompatible mitigation plans, so as to eliminate the incompatibility.

16 Claims, 3 Drawing Sheets

(58) Field of Classification Search
USPC .......................................................... 726/23
See application file for complete search history.

(56) References Cited

U.S. PATENT DOCUMENTS

| | | | | |
|---|---|---|---|---|
| 10,657,262 | B1* | 5/2020 | Cui ..................... | G06F 21/54 |
| 11,663,382 | B1* | 5/2023 | Cascioli ................. | G06F 30/33 |
| | | | | 703/15 |
| 2006/0242694 | A1* | 10/2006 | Gold ................... | H04L 63/1441 |
| | | | | 726/13 |
| 2017/0366575 | A1* | 12/2017 | Polepalli ............. | H04L 63/1458 |
| 2019/0041223 | A1* | 2/2019 | Yang ..................... | G01C 21/30 |
| 2019/0058729 | A1* | 2/2019 | Brecl ..................... | H04L 63/20 |
| 2019/0230116 | A1* | 7/2019 | Compton ............... | G06N 20/00 |
| 2020/0021609 | A1* | 1/2020 | Kuppanna ............... | H04L 63/20 |
| 2020/0137103 | A1* | 4/2020 | Ngo ...................... | G06F 40/20 |
| 2020/0280573 | A1* | 9/2020 | Johnson ................ | G06F 21/316 |
| 2021/0112091 | A1* | 4/2021 | Compton ............ | H04L 63/1416 |
| 2021/0144168 | A1* | 5/2021 | Vester .................... | G06F 9/451 |

OTHER PUBLICATIONS

Written Opinion of the International Searching Authority dated Feb. 16, 2021 for corresponding International Application No. PCT/FR2020/052194, filed Nov. 26, 2020.

M. Boucadair et al., "Distributed Denial-of-Service Open Threat Signaling (DOTS) Data Channel Specification; draft-ietf-dots-data-channel-31", Internet Draft, Jul. 22, 2019.

T. Reddy et al., "Distributed Denial-of-Service Open Threat Signaling (DOTS) Signal Channel Specification; draft-ietf-dots-signal-channel-39", Internet Draft, Nov. 20, 2019.

English translation of the Written Opinion of the International Searching Authority dated Mar. 2, 2021 for corresponding International Application No. PCT/FR2020/052194, filed Nov. 26, 2020.

* cited by examiner

[Fig. 1]
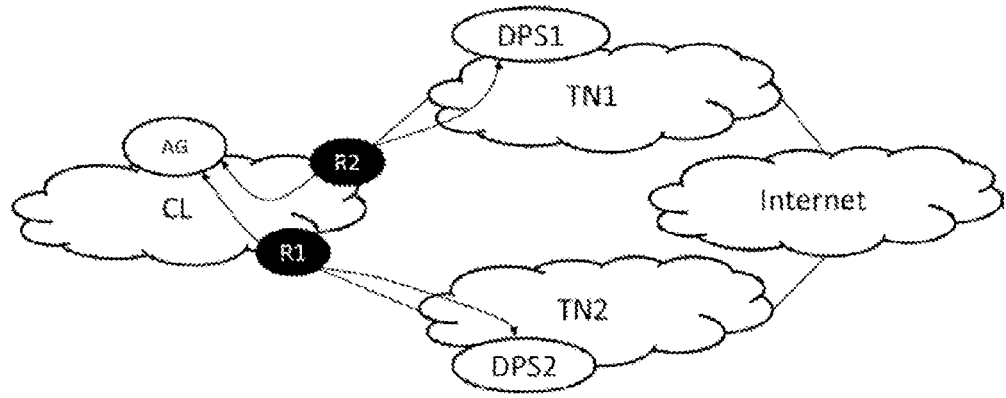
[Fig. 2]
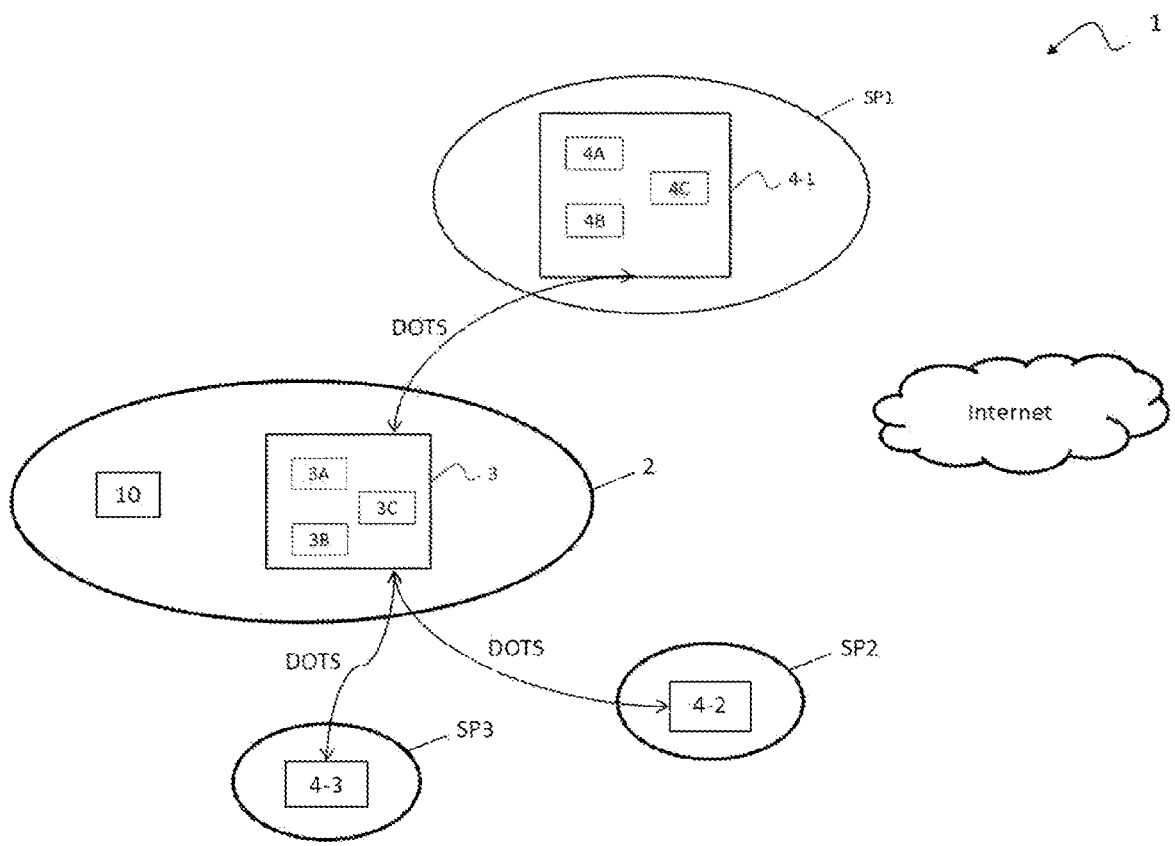
[Fig. 3]
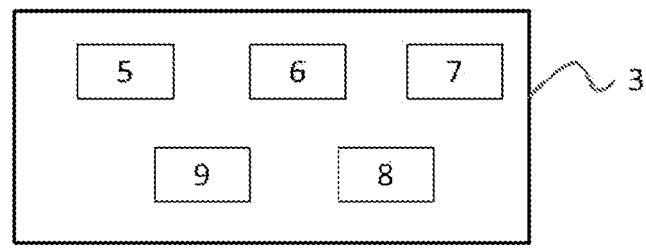

[Fig. 4]
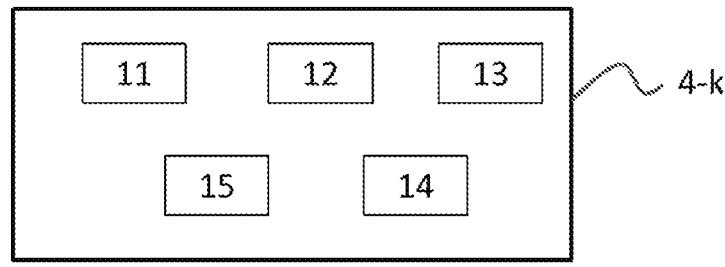
[Fig. 5]
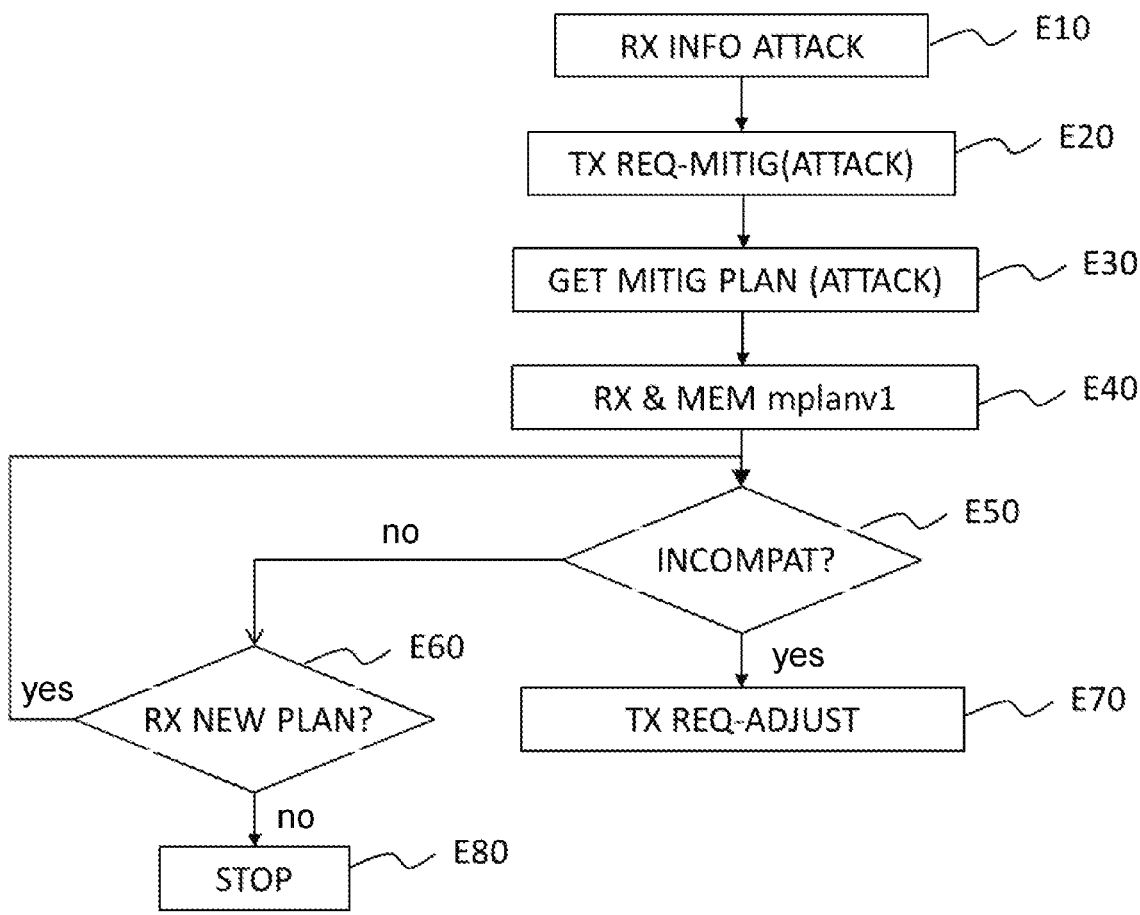

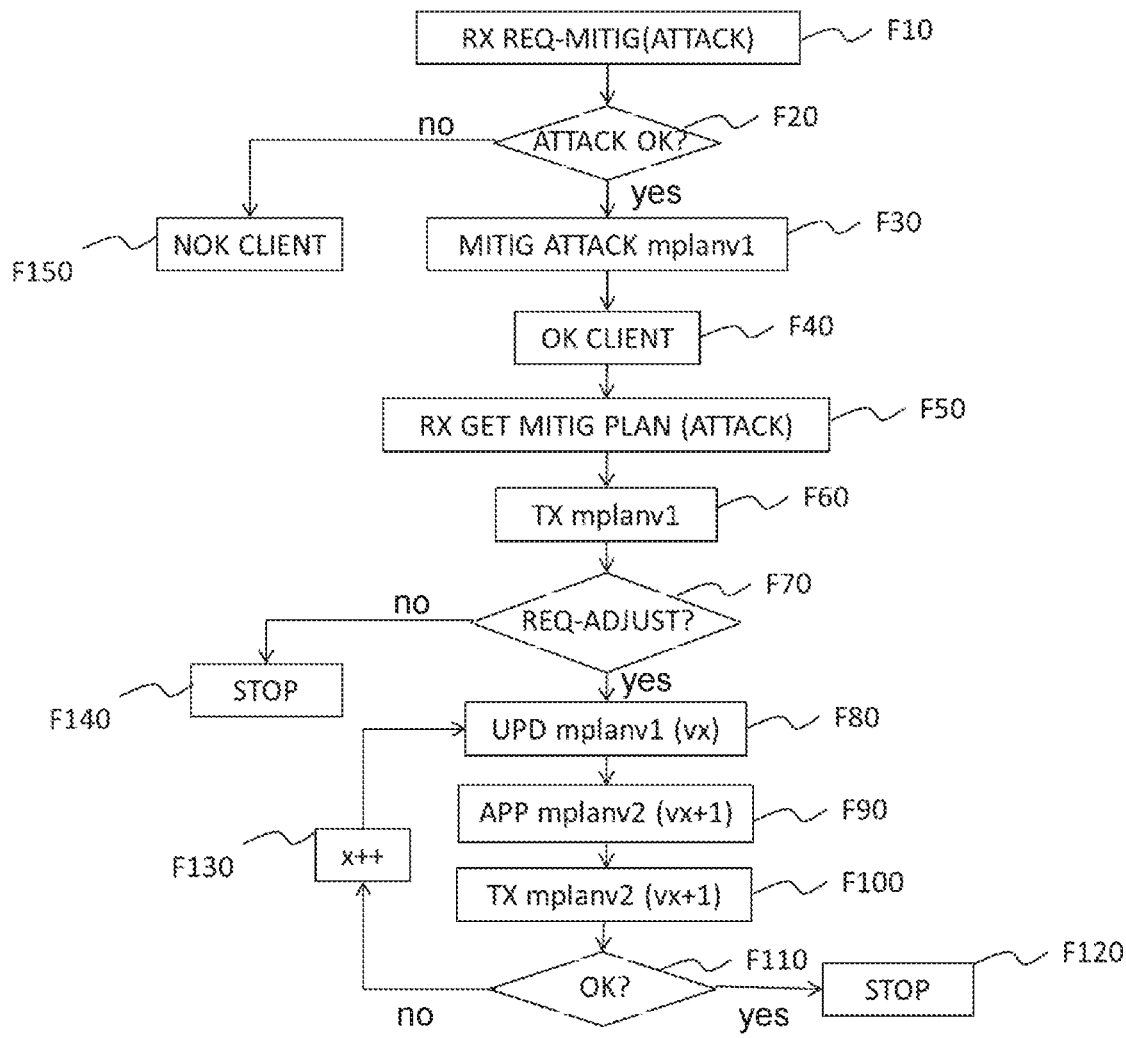

METHOD FOR COORDINATING THE MITIGATION OF A CYBER ATTACK, ASSOCIATED DEVICE AND SYSTEM

CROSS-REFERENCE TO RELATED APPLICATION

This Application is a Section 371 National Stage Application of International Application No. PCT/FR2020/052194, filed Nov. 26, 2020, which is incorporated by reference in its entirety and published as WO 2021/105626 A1 on Jun. 3, 2021, not in English.

FIELD OF THE DISCLOSURE

The invention pertains to the general field of telecommunications.

It relates more particularly to the resolution of cyber attacks liable to affect the resources of a computing domain benefiting from connectivity to the public Internet network.

The invention applies in particular to denial of service (DoS) or DDoS (Distributed DoS) cyber attacks. A DoS attack is an attempt to make resources of a computing domain, such as for example network or computing resources, unavailable to their users.

BACKGROUND OF THE DISCLOSURE

DDoS attacks are often massive and likely to compromise several hundred thousand user equipments (fixed or mobile terminals, connected objects, servers, network resources, etc.), which may in turn be used as relays to amplify the harmful power of these attacks. By way of indication, the company Symantec, in its 2019 annual report, documents nearly 24000 applications embedded in mobile terminals blocked every day by such attacks, an increase of 600% between 2016 and 2017 in attacks targeting connected objects, and an increase in the volume of attack traffic between 2016 and 2017 that represented 5% of global web traffic in 2016 compared to 7.8% in 2017.

DDoS attacks are becoming increasingly frequent and intense. They are furthermore wide-ranging, both in terms of their size (volume of traffic in the attack, amplitude of the attack, etc.) and their scope for harm (a single machine targeted, or multiple machines by targeting the local area network of a company, the network of an operator, etc.). The targets of these attacks or the relays used to propagate them are also extremely varied: fixed or mobile terminals, connected objects, servers, network resources, etc.

To protect their computing resources against such attacks, many companies subscribe to offerings from DPS (for "DDoS Protection Services") protection services. However, when so many machines are involved in carrying out the attacks, implementing appropriate filtering policies, that is to say filtering policies capable of isolating the traffic coming from all affected machines, is all the more complicated since these machines may be distributed over multiple distinct networks. These networks are themselves able to be protected by distinct DPS offerings offered and managed by distinct and independent administrative entities. It should also be noted that an increasing number of DPS protection offerings are based on services hosted in the "cloud", and not only within infrastructures operated by Internet access providers.

FIG. 1 shows, by way of illustration, a client computing domain CL connected to two transit networks TN1 and TN2 providing it with access to the Internet.

Each transit network hosts a DPS dedicated protection service protecting the client computing domain. This DPS protection service is referenced DPS1 for the transit network TN1, and DPS2 for the transit network TN2. It is assumed, in the example of FIG. 1, that the transit networks TN1 and TN2 are managed by distinct administrative entities (for example by distinct operators). The protection services DPS1 and DPS2 thus have no mutual visibility (that is to say no knowledge) with regard to the mitigation actions implemented by one and the other of the protection services against a cyber attack targeting the resources of the client computing domain (or client domain) CL that are protected by these protection services. This lack of visibility may lead to a lack of effectiveness of the combined action of the two protection services.

By way of illustration, it will be assumed that, upon detection of an attack affecting one or more resources of the client computing domain CL, an agent AG of the client computing domain CL calls upon the two protection services DPS1 and DPS2 to resolve the attack. As mentioned above, these protection services protect the client computing domain, and in particular the interconnection links connecting the client domain CL to the transit networks TN1 and TN2, links which are involved in routing the attack traffic (it should be noted that these links are not necessarily the target of the attack).

Following the call from the agent AG, each of the services DPS1 and DPS2 implements a mitigation plan against the detected attack, here comprising actions for redirecting traffic entering the client computing domain CL. For example, the service DPS1 activates a policy of redirecting traffic to the interconnection link R1, while the service DPS2 activates a policy of redirecting traffic to the interconnection link R2.

In doing so, a routing loop is created between the routers R1 and R2, and legitimate traffic is no longer able to be routed to the client domain CL.

Such a situation is of course detrimental to resolving cyber attacks experienced by a computing domain. It should be noted that the above considerations are not limited to DDoS attacks, and remain applicable to other types of attack, such as identity spoofing attacks (for example for data theft purposes), ransomware, etc.

SUMMARY OF THE INVENTION

The invention makes it possible in particular to rectify the drawbacks of the prior art by proposing a coordination method, implemented by a device managing resources of a computing domain that are protected by a plurality of cyber attack protection services, said method comprising:
  a step of obtaining mitigation plans implemented by some protection services of said plurality of protection services in response to a cyber attack targeting at least one of said resources of the computing domain; and,
  following detection of at least one incompatibility between some of the obtained mitigation plans, a step of coordinating an adjustment of all or some of said incompatible mitigation plans with the protection services that implemented said incompatible mitigation plans, so as to eliminate said at least one incompatibility.

In correlation, the invention also targets a device managing resources of a computing domain, said device being configured so as to communicate with a plurality of cyber attack protection services protecting the resources of the computing domain, said device comprising:

an obtainment module, configured so as to obtain mitigation plans implemented by some protection services of said plurality of protection services in response to a cyber attack targeting at least one of the resources of the computing domain;

a detection module, configured so as to detect the existence of at least one incompatibility between some of the obtained mitigation plans; and a coordination module, configured so as to coordinate an adjustment of all or some of said incompatible mitigation plans with the protection services that implemented the incompatible mitigation plans, so as to eliminate said at least one incompatibility.

Hereinafter, a "mitigation plan" is the name given to the set of actions implemented by a protection service to resolve an attack. These actions more particularly make it possible to prevent attack traffic from propagating to affect a given target. There is no limit attached to the nature of the resources that may be targeted by an attack; they may be for example an IP address, an IP prefix, a machine, an alias, a fully qualified domain name (FQDN), etc.

Incompatibility is understood here to mean that the mitigation plans under consideration comprise actions that are inconsistent with one another or that are likely to lead to anomalies in the handling of traffic entering and/or leaving the computing domain, in particular when they are considered in combination, resulting in inappropriate or even ineffective handling of the attack and risking penalizing the correct operation of the nominal services of the client computing domain.

For example, such an incompatibility may stem from two distinct protection services applying mitigation rules that cause a routing loop, as described above with reference to FIG. 1.

According to another example, an incompatibility may stem from a protection service applying a generic rule aimed at limiting all traffic destined for the computing domain, while other protection services have implemented selective filters that spare legitimate traffic (that is to say traffic not corrupted by the attack).

According to yet another example, in the context of a client domain supporting only IPv4 (respectively IPv6) connectivity and not implementing an IPv6 address to IPv4 address (respectively IPv4 address to Ipv6 address) translation mechanism, the protection services protecting the client domain should implement mitigation plans relating only to one and the same address family (IPv4 or IPv6). An incompatibility is therefore detected when the device managing the resources of the computing domain is informed that a first protection service applies a filter involving only IPv4 (respectively IPv6) addresses, while a second protection service applies a filter involving only IPv6 addresses.

According to yet another example, an incompatibility may be detected when the mitigation actions executed in accordance with two distinct mitigation plans comprise filtering rules that apply to distinct protocols, while they concern the same attack traffic, etc.

These various examples of incompatibility are of course given only by way of illustration. There is no limit attached to the type of incompatibility that may be detected by the device of the computing domain.

The invention thus proposes to coordinate the mitigation actions implemented, where applicable, against a cyber attack targeting one or more resources of a computing domain, by protection services that may be managed by distinct administrative entities and subscribed to by the computing domain in order to protect its resources. In the remainder of the description, the computing domain under consideration is denoted "client" domain or client computing domain.

This coordination of the mitigation actions is advantageously carried out, in accordance with the invention, by a device managing the resources of the client computing domain, denoted "client device" here for the sake of simplification. Such a client device is a functional entity, able to execute actions for resources of the client computing domain that it manages. It may be physically embedded in a network element of the client computing domain, or in a (trusted) element authorized to control the client computing domain by the owner or the administrator thereof (for example a dedicated control network, a mobile telephone of an administrator of the computing domain).

Advantageously, the client computing domain, and more specifically the client device managing the resources of the client computing domain, may easily have knowledge of the various mitigation actions implemented by the various protection services protecting the resources of the client computing domain that are managed by this device, such that said device may easily and effectively coordinate these actions. By virtue of this visibility, the client device may indeed, on the one hand, detect the existence of mutually incompatible mitigation actions implemented by two (or more) protection services, and, on the other hand, coordinate the adjustment of these mitigation actions that are deemed incompatible in order to resolve this incompatibility. The result of this coordination by the client device is fast and reliable resolution of cyber attacks targeting the resources that it manages.

By virtue of the invention, the management of the attack affecting the computing domain is therefore improved compared to the prior art, since it is carried out in a global manner by simultaneously including all of the DPS services in question and the client domain at the origin of the one or more coordination actions.

The management of this coordination by the computing domain itself (through the client device) also makes it possible to comply with the scope of action of each protection service, and to accommodate the lack of mutual knowledge of the mitigation actions implemented by the various protection services. It is not necessary to modify this scope or the visibility of the protection services on the traffic entering/leaving the computing domain in order to have an effective action against the attack detected within it. In other words, the various protection services continue to have, where applicable, only partial visibility of the traffic associated with the client domain, and not of the overall traffic of the client domain. With reference to FIG. 1, the protection service DPS1 (or DPS2) has visibility only of the traffic routed by the interconnection link managed by TN1 (or TN2).

The invention thus offers an effective solution for reliably and automatically handling cyber attacks targeting resources of a computing domain that are protected by multiple protection services managed by distinct administrative entities. This thus ensures the ability to handle attacks affecting all of the resources of the computing domain and guarantees the continuity of the services offered or subscribed to by the computing domain.

It should be noted that there is no limit attached to the nature of the cyber attacks to which the invention is applicable (denial of service, identity spoofing, ransomware, etc.), nor to the nature of the impacted resources of the computing domain (computing resources, network resources, interconnection links with other networks, etc.).

In one particular embodiment, the coordination step comprises:
- sending, to at least one protection service that implemented an incompatible mitigation plan, a request to adjust this incompatible mitigation plan, said request comprising at least one item of information characterizing said at least one detected incompatibility;
- after obtaining at least one adjusted mitigation plan, a step of checking its compatibility with the other obtained mitigation plans;

the sending and checking steps being reiterated for as long as there is still an incompatibility between some obtained mitigation plans.

The one or more protection services contacted by the client device and required to adjust their mitigation plans may in particular be selected according to an effectiveness of these mitigation plans.

For example, the client device managing the resources of the computing domain may send an adjustment request to the one or more protection services having the one or more least effective mitigation plans for combating the detected attack. Such an effectiveness may be assessed by the client device based on local information that it possesses, such as for example the analysis of IPFIX (IP Flow Information Export) sample readings from interconnection routers, fragment counters or counters of the number of errors observed on certain routers, or the connection time to connect to a service. It should be noted that the analysis function may also be provided by an external functional element that interfaces with the client device (for example a telemetry module).

This embodiment makes it possible to limit the adjustments that are made, along with the checks performed by the client device following the adjustments to ensure the compatibility of the mitigation actions implemented against the attack. It should be noted that this embodiment preferably applies when the protection service that is contacted is able to propose an adjustment of the mitigation plan that allows the incompatibility to be eliminated quickly. In this way, rapid convergence on a coordinated action of the protection services against the detected attack may be achieved.

In another embodiment, the adjustment request is sent to all of the protection services that implemented the incompatible mitigation plans.

In other words, in this embodiment, it is the attack handling method that is reviewed by each protection service. In some contexts, it may be the case that convergence on mutually compatible plans is difficult to achieve. The coordination of the protection services may therefore, in this embodiment, take more time than in the previous embodiment. However, this embodiment is beneficial when it is assumed that an adjustment of the mitigation plans of all or some of the protection services is required.

It should be noted that the client device may be configured so as to be able to implement these embodiments, and choose one or the other of these embodiments based on the detected attack and/or the one or more observed incompatibilities.

In one particular embodiment, said at least one item of information contained in the adjustment request sent to a protection service comprises at least one reference to a rule of the mitigation plan implemented by this protection service at the origin of the detected incompatibility.

Such a reference may in particular be an identifier, a rule name, or the technical characterization of a rule.

This facilitates the adjustment of the mitigation plan by the protection service receiving the adjustment request, which may adapt its mitigation actions more effectively and more quickly to eliminate the detected incompatibility.

The adjustment request may comprise other information aimed at characterizing the incompatibility and allowing the contacted protection service to effectively adjust its mitigation plan in order to eliminate this incompatibility (without otherwise creating other incompatibilities if possible). For example, the request may include a specific error code for further characterizing the incompatibility ('0': routing loop, '1': excessively generic filtering rule, '2': inappropriate address family, etc.). Depending on the error code that is returned, additional information may be communicated, such as for example in the case of the code '0', the request may comprise a description for identifying the routing loop (for example, in the context of FIG. 1, loop_node=R1, loop_node=R2).

In one particular embodiment, the method furthermore comprises:
- a step of detecting an update to at least one of the obtained mitigation plans; and
- a step of checking a compatibility of said update with the other obtained mitigation plans.

This embodiment makes it possible to take into account the dynamic evolution of certain mitigation plans, for example in order to adapt to the detected attack.

Such an update may be detected in various ways.

This detection may in particular be based on the client device sending, to at least one protection service that implemented a mitigation plan against the attack, a message checking whether an update to this mitigation plan has been performed. Such a message may in particular be sent regularly by the client device to said at least one protection service, so as to be informed as quickly as possible of the existence of a modification of a mitigation plan and to be able to intervene quickly if such a modification is incompatible with other mitigation plans that are already being implemented.

In this variant embodiment, it is therefore the client device that calls upon the protection services to determine whether they have modified their mitigation plans.

According to another variant, the client device may be informed of an update to a mitigation plan at the initiative of the protection service that performed said update.

To this end, the client device may subscribe to a notification service notifying the modifications made to the mitigation plans implemented by the protection services, for example with these protection services.

In this variant, the exchanges between the client device and the protection services are advantageously limited. The client device is able to detect anomalies in the handling of the attack by analyzing the various updates to the actions executed by the protection services, and is able to react quickly in order to coordinate these actions. This variant also facilitates the diagnosis of an attack.

In one particular embodiment, the method furthermore comprises:
- a step of determining an incapability of a protection service of said plurality of protection services to handle said cyber attack;
- a step of developing a mitigation plan for mitigating said attack based on:
  - one of the obtained mitigation plans; and/or
  - assistance provided by at least one protection service of said plurality of protection services; and
- a step of transmitting the developed mitigation plan to the protection service exhibiting said incapability so as to allow it to handle said attack.

This embodiment makes it possible to dynamically provide assistance to a protection service incapable of handling a cyber attack detected in the computing domain. This assistance takes the form of a mitigation plan developed and provided by the client device to the incapable protection service, based on a mitigation plan proposed by another protection service in response to the attack, or based on the assistance of at least one other protection service, thus making it possible to rectify a functional or capacity deficiency of the incapable protection service.

It should be noted that this embodiment is not limited to a local application within the computing domain, by the client device, of the developed mitigation plan in order to compensate for the deficiency of the incapable protection service, this application not always being possible depending on the state of the resources affected by the attack. Rather, this embodiment also makes provision to transmit the developed mitigation plan to the incapable protection service so that it is able to overcome its shortcomings and resolve the attack. This offers the possibility, when the protection service protects interconnection links interconnecting the computing domain with the Internet or with transit networks, to block attack traffic in advance, upstream and/or at the entrance of the client computing domain.

In light of the above, the invention is based not only on the coordination action of the client device managing the resources of the computing domain that are protected by the various protection services, but also on the action thereof when they are called upon, where applicable, by the client device to adjust their mitigation plans or to provide assistance to one thereof, when it is incapable of handling the attack.

Thus, according to another aspect, the invention also targets a mitigation method, performed by a first protection service of a plurality of cyber attack protection services protecting resources of a computing domain, said method comprising:
  a step of implementing a mitigation plan against a cyber attack targeting at least one of said resources of the computing domain;
  following at least one incompatibility detected by a device managing said resources of the computing domain between said mitigation plan and at least one other mitigation plan implemented against said cyber attack by a second protection service of said plurality of protection services:
    a step of adjusting the mitigation plan implemented by the first protection service in order to eliminate said at least one detected incompatibility; and
    a step of sending the adjusted mitigation plan to the device managing the resources of the computing domain.

In correlation, the invention also relates to a device of a first protection service of a plurality of cyber attack protection services protecting resources of a computing domain, said device comprising:
  an application module configured so as to implement a mitigation plan against an attack targeting at least one of said resources of the computing domain;
  an adjustment module and a sending module, both activated following detection, by a device managing said resources of the computing domain, of at least one incompatibility between said mitigation plan and at least one other mitigation plan implemented against said cyber attack by a second protection service of said plurality of protection services, said adjustment module being configured so as to adjust the mitigation plan implemented by the first protection service in order to eliminate said at least one incompatibility, and said sending module being configured so as to send the adjusted mitigation plan to the device managing the resources of the computing domain.

The mitigation method and the device of the first protection service benefit from the same advantages mentioned above as the coordination method and the device managing the resources of the computing domain.

In one particular preferred embodiment, the adjusted mitigation plan is implemented immediately by the first protection service, in other words as soon as it is developed.

This makes it possible to ensure the continuous application of mitigation actions against the attack by the first protection service.

In another particular embodiment, the first protection service implements the adjusted mitigation plan following checking, by the device managing the resources of the computing domain, that the adjusted mitigation plan is compatible with other mitigation plans implemented against said attack.

In one particular embodiment, the mitigation method comprises:
  a step of updating the mitigation plan implemented by the first protection service; and
  a step of notifying said update to the device managing the resources of the computing domain.

In one particular embodiment of the invention, the coordination method and/or the mitigation method are implemented by a computer. The computer implementing the steps of the coordination method may or may not be connected directly to the computing domain; it may be a resource in its own right of the computing domain or an entity that does not belong directly to the computing domain, such as for example a smartphone able to manage the resources of the computing domain.

The invention also targets a first computer program on a recording medium, this program being able to be implemented in a computer or more generally in a device managing the resources of a client computing domain in accordance with the invention and comprising instructions designed to implement a coordination method as described above.

The invention also targets a second computer program on a recording medium, this program being able to be implemented in a computer or more generally in a device of a cyber attack protection service in accordance with the invention and comprising instructions designed to implement a mitigation method as described above.

Each of these programs may use any programming language, and be in the form of source code, object code, or of intermediate code between source code and object code, such as in a partially compiled form, or in any other desirable form.

The invention also targets an information medium or a recording medium able to be read by a computer, and comprising instructions of the first, the second or the third computer program mentioned above.

The information or recording media may be any entity or device capable of storing the programs.

For example, the media may include a storage means, such as a ROM, for example a CDROM or a microelectronic circuit ROM, or else a magnetic recording means, for example a hard disk, or a flash memory.

Moreover, the information or recording media may be transmissible media such as an electrical or optical signal, which may be routed via an electrical or optical cable, by radio link, by wireless optical link or by other means.

The programs according to the invention may in particular be downloaded from an Internet network.

As an alternative, each information or recording medium may be an integrated circuit in which a program is incorporated, the circuit being designed to execute or to be used in the execution of the coordination method, in accordance with the invention, or of the mitigation method, in accordance with the invention.

The invention also targets a protection system for protecting a computing domain comprising:
- a plurality of protection services for protecting the resources of the computing domain against cyber attacks;
- a device managing the resources of the computing domain, in accordance with the invention, and configured so as to communicate with these protection services;

wherein at least one of the protection services comprises a device according to the invention.

The system according to the invention benefits from the same advantages mentioned above for the coordination method, the mitigation method, the device managing the resources of the computing domain and the device of the protection service according to the invention.

It is also possible to contemplate, in other embodiments, the coordination method, the mitigation method, the device managing the resources of the computing domain, the device of the protection service and the system according to the invention having all or some of the abovementioned features in combination.

BRIEF DESCRIPTION OF THE DRAWINGS

Other features and advantages of the present invention will emerge from the description given below, with reference to the appended drawings which illustrate an exemplary embodiment thereof that is in no way limiting. In the figures:

FIG. 1, already described, shows a computing domain protected by two cyber attack protection services, according to the prior art;

FIG. 2 shows a protection system for protecting a computing domain in accordance with the invention in one particular embodiment;

FIG. 3 shows the hardware architecture of a client device of the protection system of FIG. 2, in one particular embodiment;

FIG. 4 shows the hardware architecture of a server device of a protection service of the protection system of FIG. 2, in one particular embodiment;

FIG. 5 shows the main steps of a coordination method according to the invention as they are implemented, in one particular embodiment, by a client device of the protection system of FIG. 2; and FIG. 6 shows the main steps of a mitigation method according to the invention as they are implemented, in one particular embodiment, by a server device of the protection system of FIG. 2.

BRIEF DESCRIPTION OF ILLUSTRATIVE EMBODIMENTS

FIG. 2 shows a protection system 1 for protecting a computing domain 2 against cyber attacks, in accordance with the invention, in one particular embodiment.

A computing domain, also referred to as client computing domain or client domain, is understood here to mean a set of computing resources (including in particular network resources such as routers, switches, servers, terminals, etc.), placed under the responsibility of a given administrative entity. Such a computing domain is for example a company network, a home network or an autonomous system (or AS for short) using the BGP (for "Border Gateway Protocol") protocol. However, there is no limit attached to the nature of the computing domain 2 nor to the protocols used within the computing domain 2.

The computing domain 2 is connected to the public Internet network, directly or via one or more transit networks. It possesses various computing resources (CPU resources, memory resources, network resources, interconnection links with other networks, etc.) that are protected by a plurality of cyber attack protection services SP1, SP2, . . . , SPN to which the administrator or owner of the computing domain 2 has subscribed, N denoting an integer greater than 1. For the sake of simplification, FIG. 2 shows three protection services SP1, SP2 and SP3, but the number N may be any integer greater than 1.

All or some of the protection services SP1, SP2, . . . , SPN protecting the resources of the computing domain 2, and in particular in the example contemplated here SP1, SP2 and SP3, are managed by distinct administrative entities (for example by network operators). In other words, each of these administrative entities has no visibility of the attack mitigation actions implemented by the other administrative entities and their own protection services (that is to say no knowledge a priori of these mitigation actions). In the remainder of the description, a "mitigation plan" is understood to mean the set of actions implemented by a protection service to resolve an attack, in particular with a view to preventing the attack traffic from propagating so as to reach one or more targets in the computing domain 2.

There is no limit attached to the location of the protection services SP1, SP2, . . . , SPN. They may be hosted on one or more devices (for example on one or more servers) located in a cloud computing system (more commonly referred to as "cloud"), on the Internet, or in transit networks providing the client computing domain 2 with access to the Internet, etc. A protection service SPk, k=1, . . . , N is thus understood here to mean both the service itself provided to the computing domain 2 and the one or more devices hosting the logic of this service. Therefore, no assumption is made with regard to the functional and hardware structure of a protection service SPk, k=1, . . . , N.

Consideration is given here, by way of illustration, to the example of distributed denial of service (or DDoS) attacks, and it is assumed that the computing domain 2 comprises one (or more) DDoS attack detection functions. The protection services SPk, k=1, . . . , N are therefore DPS protection services in this case. However, these assumptions are not limiting per se, and the invention is applicable to any type of cyber attack (denial of service, identity spoofing, ransomware, etc.). Furthermore, there is no limit attached to the nature of the resources that may be targeted by an attack; they may be for example an IP address, an IP prefix, a machine, an alias, a fully qualified domain name (FQDN), etc.

In the embodiment described here, the protection system 1 is based on a DOTS (for "DDoS Open Threat Signaling") client/server architecture as defined by the IETF (Internet Engineering Task Force). As is known, the DOTS architecture specified by the IETF aims to provide a signaling mechanism for detecting suspicious traffic or even a proven attack, such that appropriate mitigation measures are able to be implemented as quickly as possible. More particularly, it allows a client, called DOTS client, who manages the resources of a computing domain to inform a server, called DOTS server, of the detection of suspicious traffic potentially characteristic of a DDoS attack in progress and that appropriate mitigation actions are required. The DOTS server may then implement or coordinate various actions so that, for example, the traffic associated with the denial of service attack is no longer routed to the computing domain of the DOTS client, and that only approved (that is to say legitimate) traffic is routed to said computing domain. It should be noted that the DOTS client is not necessarily a network element of the computing domain in question, but may be connected indirectly thereto; it may be for example a control network or a terminal (for example a smartphone) of an administrator of the computing domain, etc.

For this purpose, two DOTS communication channels are defined between the DOTS client and the DOTS server:
- a DOTS signal channel: this channel is only used for the duration of DDoS attacks. The DOTS client may thus use this channel to ask for help from the DOTS server by informing it that an attack is in progress. Table 1 illustrates one example of a mitigation request that may be sent via a DOTS signal channel "ietf-dots-signal-channel" (corresponding to a target of the attack identified by the "ietf-dots-signal-channel:mitigation-scope" attribute in table 1), by a DOTS client identified by a unique identifier CUID (for "Client Unique Identifier") "mydotsclient", to its DOTS server, to inform it that the prefix "1.2.3.0/24" (identified in the "target-prefix" field) is experiencing a DDoS attack. Upon receipt of such a mitigation request (able to be recognized by the nature of the request (PUT) and the presence of the attributes Un-Path ("mitigate") and ("mid")), the DOTS server, after checking that this DOTS client is authorized to request actions for the prefix "1.2.3.0/24", takes appropriate measures to stop the attack if this request does not conflict with other requests coming from other clients in the same computing domain or with a filtering rule installed by another DOTS client of the domain, and if the server is authorized to/configured so as to honor the last mitigation request received. In the event of a conflict, the server returns a "4.09 Conflict" error message to inform the client;
- a DOTS data channel: this channel is used if and only if no attack is in progress. The DOTS client may for example use this channel to install filtering rules (or ACL for "Access Control List"), such as filtering traffic received from certain addresses or destined for a given machine. Table 2 provides the example of a message sent on a DOTS data channel "draft-ietf-dots-data-channel" (corresponding to a filter characterized by the "ietf-dots-data-channel:access-lists" attribute in table 2), by a DOTS client with the CUID identifier "mydotsclient", asking a DOTS server to block ("actions": {"forwarding": "drop"}) all traffic destined for the prefix "1.2.3.0/24". Upon receipt of such a request (able to be recognized by the nature of the request (POST), of the "Request-URI" ("/restconf/data/ietf-dots-data-channel:dots-data/dots-client=mydotsclient"), and by the presence of the attribute "ietf-dots-data-channel:access-lists"), and after checking that this DOTS client is authorized to request the installation of filtering rules for the prefix "1.2.3.0/24", the DOTS server proceeds to install filtering rules if this request does not conflict with other requests coming from other clients of the same computing domain or with an existing filtering rule. In the event of a conflict with other rules maintained by the DOTS server, the latter returns a "4.09 Conflict" error message to inform the DOTS client.

These various channels are described in more detail respectively in the documents by T. Reddy et al. entitled "Distributed Denial-of-Service Open Threat Signaling (DOTS) Signal Channel Specification", and M. Boucadair et al. entitled "Distributed Denial-of-Service Open Threat Signaling (DOTS) Data Channel Specification", published by the IETF in 2019.

TABLE 1

```
Header: PUT (Code = 0.03)
Uri-Host: www.example.com
Uri-Path: ".well-known"
Uri-Path: "dots"
Uri-Path: "v1"
Uri-Path: "mitigate"
Uri-Path: "cuid=mydotsclient"
Uri-Path: "mid=57956"
Content-Format: "application/cbor"
    {
        "ietf-dots-signal-channel:mitigation-scope": {
            "scope": [
                {
                    "target-prefix": [
                        "1.2.3.0/24",
                    ],
                    "target-port-range": [
                        {
                            "lower-port": 80
                        }
                    ],
                    "target-protocol": [
                        6
                    ]
                }
            ]
        }
    }
```

TABLE 2

```
POST /restconf/data/ietf-dots-data-channel:dots-data\
    /dots-client=mydotsclientHTTP/1.1
Host: {host}.{port}
Content-Type: application/yang-data+json
"ietf-dots-data- channel:access- lists": {
    "acl": [
        {
            "name":"my-acl".
            "type:": "ipv4-acl-type"
            "aces": {
                "ace": [
                    {
                        "name": "my-example",
                        "matches"; {
                            "I3", ?
                            "ipv4" (
                                "destination-ipv4- network": "1.2.3.0/24"
                            }
                        }
                    },
                    "actions": {
                        "forwarding"; "drop"
                    }
                }
            ]
        }
    ]
}
```

DOTS is therefore an architecture intended to facilitate the handling of attack mitigation requests sent by a DOTS client and received by a DOTS server, such as for example a server operated by a cyber attack protection service provider.

It is assumed here that the computing domain 2 comprises a device 3, in accordance with the invention, responsible for managing and monitoring all of the computing resources of the computing domain 2, and the protection services SP1, SPN comprise devices 4-1, . . . , 4-N, respectively, also in accordance with the invention, the device 3 and the devices 4-1, . . . , 4-N being able to interact with one another according to the principles that have just been described and are characteristic of the DOTS client/server architecture. In this operating mode, the device 3 acts as a DOTS client (it is referred to hereinafter as "client device 3" for the sake of simplification) and the devices 4-1, 4-2, . . . , 4-N act as DOTS servers. The invention however applies to other architectures and/or to other protocols allowing the devices 3, 4-1, . . . , 4-N to communicate with one another.

It should be noted that, for the sake of simplification, in the example contemplated in FIG. 2, the client device 3 and each of the server devices 4-1, . . . , 4-N communicate directly with one another (possibly after prior authentication of the DOTS client device 3 by the DOTS server device under consideration). As a variant, the DOTS communications between a DOTS client and a DOTS server may take place via relays (or "DOTS gateways"). These relays may be hosted within the domain of the DOTS client (also referred to as "client domain") or within the domain of the server (also referred to as "server domain"), or in both. A DOTS relay located in a domain of the client is considered to be a DOTS client by a DOTS server. A DOTS relay located in a server domain is considered to be a DOTS server by a DOTS client.

It should also be noted that, in the event a DOTS relay being present in a server domain, the relay is responsible for authenticating the DOTS clients. A DOTS server should be configured with the list of active DOTS relays within its domain; it may then delegate some of its functions to these trusted relays. In addition, the DOTS server may securely use the information provided by a relay contained in a list declared to the DOTS server and held thereby, by way of an ad-hoc authentication procedure (for example, explicit configuration of the list of relays by the authorized administrator of the server, retrieval of the list from an AAA (for "Authentication, Authorization and Accounting") server, etc.).

In the embodiment described here, the client device 3 is configured so as to establish, with the server devices 4-1, . . . , 4-N of the protection services SP1, SPN (or DOTS relays located in the computing domains hosting the server devices 4-1, . . . , 4-N), secure DOTS sessions in accordance with the abovementioned IETF specification entitled "Distributed Denial-of-Service Open Threat Signaling (DOTS) Signal Channel Specification". In particular, the sessions are established here using the DTLS (for "Datagram Transport Layer Security") protocol, or the TLS (for "Transport Layer Security") protocol. The details of the TLS/DTLS exchanges and those regarding the management of any security keys are not reproduced here.

Furthermore, in the embodiment described here, it is assumed that the various DOTS agents (clients, servers and relays) involved (that is to say the DOTS client device 3 and the DOTS server devices 4-1, . . . , 4-N or relays between these DOTS devices) are configured so as to authenticate one another. This thus ensures that DOTS messages received from a machine spoofing a legitimate DOTS server device 4-1, . . . , 4-N are rejected by the DOTS client device 3. In the same way, requests from DOTS client devices that are not authorized to access the service offered by the DOTS server device 4-1, . . . , 4-N under consideration are ignored thereby.

In the embodiment described here, the client device 3 has the hardware architecture of a computer, as shown in FIG. 3. It comprises in particular a processor 5, a random access memory 6, a read-only memory 7, a non-volatile memory 8, and communication means 9 allowing it in particular to communicate, using in particular the DOTS protocol, with the server devices 4-1, . . . , 4-N of the protection services SP1, SPN. These communication means 9 are based on a wired or wireless communication interface, which is known per se and not described in more detail here.

The read-only memory 7 of the client device 3 constitutes a recording medium in accordance with the invention, able to be read by the processor 5 and on which there is recorded a computer program PROG3 in accordance with the invention, comprising instructions for executing the steps of a coordination method according to the invention. The program PROG3 defines functional modules of the client device 3, which are activated for example here following the detection of an attack targeting at least one resource of the computing domain 2, and which are based on or control the abovementioned hardware elements 5 to 9 of the client device 3. These modules comprise in particular (cf. FIG. 2):

- an obtainment module 3A, configured so as to obtain mitigation plans from some of the protection services from among the plurality of protection services SP1, SPN that have implemented a mitigation plan in response to the detected attack;
- a detection module 3B, configured so as to detect the existence of at least one incompatibility between some of the mitigation plans obtained by the obtainment module 3A; and
- a coordination module 3C, configured so as to coordinate, with the protection services that implemented the incompatible mitigation plans, an adjustment of all or some of these incompatible plans so as to eliminate the detected incompatibility.

It should be noted that the client device 3 may also comprise a detection module configured so as to execute a DDoS attack detection function. In the embodiment described here, it is however assumed that this DDoS attack detection function is hosted by another device 10 of the computing domain 2 (cf. FIG. 2).

The various functions implemented by the modules 3A to 3C of the client device 3 are described in more detail later on.

Similarly, in the embodiment described here, each DOTS server device 4-1, . . . , 4-N has the hardware architecture of a computer, as shown in FIG. 4. It comprises in particular a processor 11, a random access memory 12, a read-only memory 13, a non-volatile memory 14, and communication means 15 allowing it in particular to communicate, using in particular the DOTS protocol, with the client device 3. These communication means 15 are based on a wired or wireless communication interface, which is known per se and not described in more detail here.

The read-only memory 13 of each server device 4-$k$, $k=1, \ldots N$ in this case constitutes a recording medium in accordance with the invention, able to be read by the processor 11 and on which there is recorded a computer program PROG4 in accordance with the invention, comprising instructions for executing the steps of a mitigation method according to the invention. The program PROG4 defines functional modules of the server device 4-*k*, which are based on or control the abovementioned hardware elements 11 to 15, and which comprise in particular (cf. FIG. 2):

- an application module 4A, activated following the detection of an attack targeting at least one resource of the computing domain protected by the protection service SPk or whose traffic is routed while involving at least one resource protected by the protection service SPk. The application module 4A is configured so as to implement a mitigation plan against said attack. Such a mitigation plan may be designed in a manner known per se based on knowledge of the characteristics of the attack, and comprises one or more rules for identifying and handling the attack traffic;
- an adjustment module 4B, activated following the detection of at least one incompatibility by the client device 3 between the mitigation plan implemented by the application module 4A and at least one other mitigation plan implemented against said attack by another protection service SPj, j=1 . . . N and j*k of said plurality of protection services. This adjustment module 4B is configured so as to adjust the mitigation plan implemented by the protection service SPk in order to eliminate said incompatibility; and
- a sending module 4C, configured so as to send the adjusted mitigation plan to the client device 3.

The various functions implemented by the modules 4A to 4C of each server device 4-*k*, k=1 . . . N are described in more detail later on. It should be noted that, for the sake of simplification, the modules 4A to 4C of the server devices 4-*k*, k=1 . . . N are shown in FIG. 2 only for the server device 4-1.

A description will now be given, with reference to FIGS. 5 and 6, of the main steps implemented respectively by the client device 3 and by the server devices 4-*k*, k=1 . . . N to improve the management of cyber attacks targeting resources of the computing domain 2 in accordance with the invention. FIG. 5 more particularly illustrates the steps of a coordination method according to the invention, as implemented by the client device 3 in one particular embodiment. FIG. 6 illustrates the steps of a mitigation method according to the invention as implemented by each server device 4-*k* of a protection service SPk called upon by the client device 3 to handle an attack, in this particular embodiment.

With reference to FIG. 5, it is assumed here that a cyber attack ATTACK on one or more resources of the computing domain 2 has been detected by the cyber attack detection function 10, in a manner known per se. This attack is signaled, by the detection function 10, to the client device 3 (step E10). During this signaling, the detection function 10 provides various information about the attack ATTACK to the client device 3, such as for example the characteristics of the attack traffic (one or more source addresses, one or more destination addresses, one or more protocol identifiers (for example ICMP (for Internet Control Message Protocol), TCP (for Transmission Control Protocol), etc.), the nature of the attack (here DDoS attack), etc. This information may be supplemented by information about the volume of the attack traffic, obtained for example by the function 10 via the collection of SNMP (for Simple Network Management Protocol) counters on the implicated interfaces.

Upon receipt of this signaling, the client device 3 sends a DOTS request to all or some of the devices 4-1, . . . , 4-N to signal the detected cyber attack ATTACK and ask them for help in resolving this attack. The DOTS request that is sent is for example a "Request Mitigation" DOTS mitigation request known from the prior art, and similar or identical to the request given by way of illustration in table 1. It is sent by the client device 3 to all of the server devices 4-1, . . . , 4-N or only to the server devices from among the server devices 4-1, . . . , 4-N protecting the resources targeted by the attack or involved in routing the attack traffic to the computing domain 2. This sending may take place in parallel to each of the server devices or sequentially.

Solely by way of illustration, it is assumed here that the protection services SP1 and SP2 protect the resources targeted by the detected attack ATTACK or involved in routing the attack traffic to the computing domain 2, and that the DOTS request is sent by the client device 3 to the server devices 4-1 and 4-2 only.

With reference to FIG. 6, the server devices 4-1 and 4-2 contacted (step F10) by the client device 3, and which are able to handle this attack (response yes in test step F20), acknowledge the attack mitigation request received from the client device 3 by sending a "2.01 Created" DOTS message thereto (step F30). "Able to handle this attack" or "capable of handling this attack" is understood to mean here that the server device has the functional capacity (that is to say it is aware of the attack, knows how to identify it and handle it) and has the hardware and/or software resources (in an appropriate number) to handle it.

Furthermore, each server device of a protection service capable of handling the attack implements, via its application module 4A, a mitigation plan to handle the traffic destined for the computing domain 2 visible thereto (in other words destined for or passing through the resources of the computing domain 2 that it protects) (step F30). It informs the client device 3 that it has successfully implemented a mitigation plan against the attack (step F40). The development and implementation of such a mitigation plan as soon as a protection service has knowledge of the characteristics of the attack and the capacities needed to handle it are known per se and are not described in more detail here.

In the illustrative example introduced above, it is assumed that the protection service SP1 is able to handle the attack, successfully implements a mitigation plan mplanv1(SP1) against this attack and informs the client device 3 thereof. It is also assumed that the protection service SP2 is able to handle the attack, successfully implements a mitigation plan mplanv1(SP2) against this attack and informs the client device 3 thereof.

With reference to FIG. 5, the client device 3 asks the protection services SP1 and SP2 that implemented a mitigation plan against the attack to provide it with these mitigation plans (step E30). For this purpose, it sends, for example, to each server device concerned, a DOTS GET request containing an attribute ("Uri-Path"), introduced for the purposes of the invention and called "mplan" here. One example of such a request is provided by way of illustration in table 3 reproduced below.

TABLE 3

Header; GET (Code=0.01)
Uri-Path: ".well-known"
Uri-Path: "dots"
Uri-Path; "mitigate"
Uri-Path: "cuid=dz6pHjaADkaFTbjr0JGBpw"
Uri-Path: "mid= 12332"
Uri-Path: "mplan"

The request may comprise an attack mitigation identifier, "mid" (for "Mitigation IDentifier"), assumed here, for the attack ATTACK, to be equal to "12332". If this identifier is not provided in the request then, in the embodiment described here, the server device has to communicate all of the mitigation plans of all of the mitigation actions currently being executed by the associated protection service.

Upon receipt of this request (step F50), the server device provides the client device 3, via its application module 4A, with the technical features of the mitigation plan implemented against the attack ATTACK (or of all of the mitigation plans currently being executed if no attack mitigation identifier is specified in the GET request) (step F60). The mitigation plan is provided in the form of a list (which may be ordered) comprising one or more rules, each rule defining (that is to say identifying) the traffic that it is desired to handle (for example the traffic identified as suspicious), and the one or more actions to be applied to the traffic identified by the rule. Such actions are for example rejecting the traffic defined by the rule associated with the action, redirecting the traffic, limiting the bit rate of the traffic, etc.

One example of a response provided by the server device is illustrated in table 4.

TABLE 4

```
{
    "ietf-dots-signal-channel: mitigation-scope": {
        "scope": [
            {
                "mid": 12332,
                "mitigation-start": "1507818434",
                "lifetime": 989,
                "status": "attack-successfully-mitigated",
                "mplan": {
                    ... (cf. table 5)
                }
            }
        ]
    }
}
```

According to this example, the mitigation plan is provided in the "mplan" attribute, in the body of the response. The "mplan" attribute may be structured in accordance with a formalism similar or identical to that of the ACLs (Access Control Lists) defined in the DOTS protocol, or in accordance with an ECA (Event, Condition, Action) chronology, etc. By way of illustration, one example of a mitigation plan is given below in table 5.

TABLE 5

```
"mplan": {
    "ace": [
        {
            "name": "rule1",
            "matches": {
                "ipv4": {
                    "destination-ipv4-network": "1.2.3.0/24",
                    "source- ipv4-network": "192.0.2.0/24"
                }
            }
            "actions": {
                "forwarding": "drop"
            }
        }
    ]
}
```

The plan described in table 5 contains an ACE (for "Access Control Entry"), that is to say a filtering action called "rule1": this action consists in rejecting (as indicated by the "forwarding" clause positioned at "drop" to reject the traffic sent by the source identified by the prefix 192.0.2.0/24, and without said source being informed of this rejection) all of the traffic defined by the "matches" attribute, that is to say in this case the traffic sent from any address of the network associated with the prefix "192.0.2.0/24" and destined for resources associated with the prefix "1.2.3.0/24".

It should be noted that a mitigation plan may, as a variant, include multiple ACE entries; indeed, distinct actions such as redirecting, reducing bit rate, etc. may be executed by one and the same mitigation service in response to an attack.

In the remainder of the description, a mitigation plan is identified in accordance with the following formalism: mplanvx=LIST_RULES(match, action, etc.), LIST_RULES denoting a list of rules, each rule being defined by one or more conditions ("match") for identifying the traffic concerned by the rule, and one or more actions ("action") recommended by the rule for the traffic thus identified. vx, x=1, 2, . . . refers to the version of the mitigation plan under consideration, v1 denoting the plan initially implemented by the protection service, v2, v3, etc., denoting adjusted or updated versions of this plan.

The client device 3 locally stores, for example in its non-volatile memory 8, all of the mitigation plans received from the protection services with the ability to handle the attack ATTACK in association with the server devices and/or the protection services that provided these plans thereto (step E40). In the remainder of the description, mplanv1(SPk,mid #j) denotes the mitigation plan initially implemented by the protection service SPk (and its server device 4-k) in response to the attack identified by the attack mitigation identifier mid #j, j denoting an integer greater than 1. It should be noted that distinct mitigation identifiers may be used for one and the same attack to facilitate the management of the mitigation plans during or after execution thereof.

Thus, in the illustrative example contemplated here, the client device 3 receives and stores, in its non-volatile memory 8, the mitigation plan obtained from the server device 4-1 in the form mplanv1(SP1,mid=12332) and the mitigation plan obtained from the server device 4-2 in the form mplanv1(SP2,mid=12332), 12332 denoting the attack ATTACK mitigation identifier.

It should be noted that, in the embodiment described here, the mitigation plans implemented where applicable by the protection services SPk, k=1, . . . , N are obtained by the client device 3 following the detection of the attack ATTACK. As a variant, it is possible to contemplate the client device 3 calling upon the protection services SPk, k=1, . . . , N in a decorrelated manner with respect to the detection of an attack ATTACK, or following the detection of an anomaly in the computing domain 2 (for example a routing loop between transit domains, loss of incoming/outgoing traffic from the computing domain 2, degradation of services accessible to the domain, etc.).

In yet another variant, it is possible to contemplate the client device 3 subscribing with the protection services SPk, k=1, . . . , N to a service for notifying the various mitigation actions implemented thereby in order to protect the resources of the computing domain 2, and/or for updating or changing these actions (stopping the action, implementing one or more additional mitigation actions, etc.).

At the end of step E40 of obtaining the attack ATTACK mitigation plans implemented, where applicable, by the various protection services that are called upon, the client device 3 checks, by way of its detection module 3B, whether the obtained mitigation plans are compatible with one another (test step E50).

To this end, the client device 3 analyzes the content of the various obtained mitigation plans, and more particularly here of each rule of each obtained mitigation plan, and determines whether these rules are consistent with one another or, on the contrary, exhibit anomalies (either in the rules themselves or in the consequences of applying these rules to the traffic). Various aspects may be taken into consideration during this analysis, and be subject to an automatic review by the detection module 3B.

This analysis may thus comprise for example, for rules presented in the form of a ("match", "action") pair as introduced above, comparing the mitigation actions recommended in the various obtained mitigation plans corresponding to one and the same traffic identification (that is to say to the same "match" parameters specified by the rules compared with one another). If the mitigation actions are different (traffic filtering for example in a plan and, on the contrary, sending the traffic identified by the "match" parameters to the computing domain 2), they may be symptomatic of an anomaly: a more in-depth analysis of these different actions may allow the detection module 3B to detect an incompatibility.

For example, the detection module 3B may examine whether these different mitigation actions are likely to cause a routing loop, as illustrated in FIG. 1, preventing legitimate traffic from being routed to the computing domain 2.

According to another example, the detection module 3B may examine whether these different actions stem from an inconsistency at the level of the protocols filtered by the protection services: if one of the protection services offers only rules filtering IPv4 prefixes, while the other protection service recommends filtering rules for IPv6 prefixes and the computing domain 2 itself uses only IPv6 prefixes without resorting to an IPv6 address to IPv4 address translation function, and vice versa, an incompatibility is detected by the detection module 3B. This incompatibility reveals an inconsistency in the mitigation plan proposed by the protection service filtering only IPv4 prefixes. This may of course apply to other protocols, such as for example to transport protocols (one filters traffic using the UDP protocol, the other filters traffic using the TCP protocol for example, etc.).

Different actions may also reveal a partial characterization of the attack traffic by one of the protection services. For example, one of the protection services concludes, from its analysis of the attack, that said attack involves multiple protocols (such as NTP (Network Time Protocol) and DNS (Domain Name System)), while another protection service that is called upon has identified only suspicious traffic based on the DNS protocol.

Of course, these examples are given only by way of illustration. A person skilled in the art knows how to configure such a detection module 3B so as to allow it to automatically detect certain anomalies in the rules of the mitigation plans provided thereto or in the consequences of applying these rules to the traffic, based on descriptions of these anomalies that are provided beforehand to the detection module 3B. It is not ruled out to dynamically change these descriptions by providing the detection module 3B with new descriptions over time. The anomaly detection may typically be enriched using machine learning techniques.

If, during the analysis performed by the detection module 3B, no incompatibility between the contents of the mitigation plans implemented to handle the attack ATTACK and obtained by the client device 3 is detected (response no in test step E50), the client device 3 puts itself into a state of waiting for a new event to be handled, for example in this case the reception of one or more new mitigation plans (these new plans possibly resulting from the detection of a new attack, or an adjustment of or an update to mitigation plans that the client device 3 already possesses), etc. (test step E60).

If at least one incompatibility between at least two mitigation plans proposed by distinct protection services is detected (response yes in test step E50), the client device 3, via its coordination module 3C, coordinates, with the protection services at the origin of the mitigation plans considered to be incompatible, an adjustment of all or some of these plans in order to eliminate the detected incompatibility.

In the embodiment described here, to perform this coordination, the client device 3 sends, via its coordination module 3C, to at least one protection service that implemented a mitigation plan detected as being incompatible with another one, a request to adjust this incompatible mitigation plan (step E70). This request comprises one or more items of information characterizing the detected incompatibility.

More particularly, according to a first variant embodiment, the client device 3 selects at least one of the "conflicting" protection services (that is to say one of the protection services that implemented incompatible plans) and notifies the server device thereof of the incompatibility detected between the mitigation plans (for example the existence of a routing loop). The notified protection service may be selected arbitrarily by the coordination module 3C from among the conflicting protection services, or it may be contemplated for the coordination module 3C to select one (or more) protection service(s) in accordance with a predetermined criterion, such as the effectiveness of its mitigation plan. The coordination module 3C may for example select the conflicting protection service that has implemented the least effective mitigation plan against the attack ATTACK. To determine the effectiveness of the mitigation plan implemented by each protection service, the coordination module 3C may use various locally available information, such as for example IPFIX sample readings, fragment counters or counters of the number of errors observed on certain routers, the connection time or more generally the access to certain services, the state of congestion of certain links, etc.

To inform each server device of the selected protection service of the detected incompatibility and ask it to adjust its mitigation plan, the client device 3 may use a "Request Mitigation" DOTS mitigation request as described above, with a new DOTS attribute introduced for the purposes of the invention, called "thirdparty-dps-conflict" here, aimed at requesting an adjustment of, in other words an update to, the mitigation plan implemented by the protection service in question. This mitigation request comprising the "thirdparty-dps-conflict" attribute constitutes an adjustment request within the meaning of the invention. It also contains information for characterizing the detected incompatibility, such as for example all or some of the mitigation plans exhibiting an incompatibility with that or those of the selected protection service(s) (typically the conflicting rules and actions or references to these rules and to these actions).

With reference to FIG. 6, upon receipt of such an adjustment request notifying it of an incompatibility with another mitigation plan for the attack ATTACK (response yes in test step F70), the server device, via its adjustment module 4B, adjusts (that is to say modifies, updates) its mitigation plan in order to eliminate the incompatibility (step F80). This adjustment consists in modifying the mitigation plan based on the information reported by the client device 3. For example, if a routing loop has been signaled, the adjustment consists in modifying the traffic redirection policy applied by the server device to eliminate this loop. Reconfiguration actions may then be implemented using mechanisms such as BGP Flowspec or by directly configuring equipments using protocols such as NETCONF.

It should be noted that, upon receipt of the adjustment request, the server device may, before modifying the mitigation actions that it has implemented, check the incompatibility reported by the client device 3. Depending on the result of this check, the server device may reject the adjustment request developed by the client device 3 and confirm its initial mitigation plan therewith. The client device 3 may then contact another protection service to try to eliminate the detected incompatibility.

It should also be noted that the actual adjustment of the mitigation actions implemented by the protection service may be performed by a mitigation server external to the server device.

In the embodiment described here, each DOTS server device is configured so as to activate (that is to say implement) the mitigation plan that it has developed against an attack without waiting for verification from the DOTS client device 3. As a result of this configuration, the server device also implements its adjusted mitigation plan, called mvplan2 here, as a substitute for the mitigation plan mvplan1, without waiting for confirmation from the DOTS client device 3 (step F90).

As a variant, it may be contemplated that the DOTS client device asks the DOTS server device for verification prior to the latter implementing the mitigation plan that it has developed (and therefore, where applicable, the adjusted mitigation plan). To this end, a new attribute, called for example "explicit-check" (Boolean), may be defined. This attribute may be included either in the initial mitigation request sent by the client device 3 to the server device or in a request to adjust its mitigation plan, where applicable. For example, if the "explicit-check" attribute is positioned at "True", then the server device should wait for explicit confirmation from the client device 3 before activating its mitigation plan. A client device may communicate its agreement to execute a plan by sending the same mitigation request, but with the value of the "explicit-check" attribute positioned at "False".

As a variant, the server device may consider that the agreement (and the verification) of the client device is implicit when it has not received any notification of a disagreement from the client device within a predetermined period of time.

The server device then sends, via its sending module 4C, its thus-adjusted plan mplanv2 to the client device 3 (step F100).

Upon receipt of the adjusted mitigation plan "mplanv2" (response "yes" in test step E60), the client device 3, via its coordination module 3C, checks whether the previously detected incompatibility is actually resolved and whether any other incompatibility has been created due to the adjustment of the mitigation plan (test step E50).

If the initially detected incompatibility is not resolved by the adjusted mitigation plan or if a new incompatibility is detected (response "yes" in step E50), the sending step E70 and verification step E50 are reiterated until there is no further incompatibility detected by the coordination module 3C of the client device 3 between the mitigation plans implemented against the attack ATTACK (whether said mitigation plans are original or adjusted). On the side of the server device, in a similar manner (response "no" in test step F110), steps F70 of receiving an adjustment request, F80 of adjusting the mitigation plan, F90 of implementing the adjusted mitigation plan as a substitute for the previous mitigation plan and F100 of sending the updated mitigation plan are reiterated (step of incrementing the version x of the mitigation plan F130). It should however be noted that it is not necessarily the same server device that is contacted by the client device 3 in each iteration to update its mitigation plan.

If not (response "no" in step E50), the adjusted mitigation plan "mplanv2" is validated (response "yes" in test step F110). In other words, the server device may continue to apply its adjusted mitigation plan "mplanv2" against the attack ATTACK, instead of the previously proposed mitigation plan mplanv1 (end step of the method F120).

According to a second variant, the client device 3 contacts all of the server devices of the protection services involved in the detected incompatibility to ask them to adjust their mitigation plans. For this purpose, it may use a "Request Mitigation" mitigation request with a "thirdparty-dps-conflict" attribute as described in the first variant.

Upon receipt of this request (response "yes" in test step F70), each server device adjusts its mitigation plan to resolve the detected incompatibility (step F80), implements its adjusted mitigation plan (step F90) and transmits it to the client device 3 (step F100), as described in the first variant. The client device 3 checks the compatibility of the adjusted mitigation plans (response "yes" in step E60 and step E50) and, in the event of incompatibility, again performs an adjustment according to the first variant or the second variant.

The modification of the mitigation plans implemented by the protection services against the attack ATTACK may result from an adjustment requested by the client device 3, but it may also result from an update performed at the initiative of the server devices associated with these protection services themselves, for example in response to a change in the attack ATTACK over time or upon detection, by the server devices, of rules that are ineffective or that need to be supplemented, etc. There is no limit attached to the reason why such an update may be contemplated by one or the other of the server devices.

To detect such an update, the client device 3 may for example regularly contact the server devices 4-$k$, $k=1, \ldots,$ N to check whether a modification has been made to their mitigation plans, and where applicable check the compatibility of the updates with the existing mitigation plans, as described above in step E50.

As an alternative, each server device may notify the client device 3 of an update of its mitigation plan at its own initiative.

If an incompatibility between the mitigation plans implemented against the attack ATTACK is detected by the client device 3 following an update to one thereof, the client device 3 proceeds as described above with reference to steps E50-E70. The same applies to the server devices concerned, which then implement steps F70-F130 described above.

The invention thus offers an effective solution for enhancing the use of a plurality of protection services to protect the resources of a client computing domain. This invention advantageously uses the visibility available to the client computing domain to coordinate the actions of the protection services.

In one particular embodiment, the coordination role of the client device 3 described above may be advantageously extended so as to furthermore allow it to manage an incapability of one of the protection services to handle the attack ATTACK.

In the illustrative example contemplated, it will be assumed that the protection service SP3 is responsible for protecting a resource targeted by the attack ATTACK or involved in routing attack traffic to the computing domain 2, and that the protection service SP3 is incapable of handling the attack ATTACK (response "no" in test step F20). There is no limit attached to the reasons why a protection service may prove incapable of handling an attack; the following reasons may for example be contemplated:

- the attack ATTACK is unknown to the protection service SP3; in other words, it has no means for identifying the attack traffic and/or does not know how to handle this attack. The protection service SP3 is therefore not capable of implementing an appropriate mitigation plan in response to the detected attack; or
- the protection service SP3 is aware of the attack but is suffering from a lack of resources available to handle the attack (capacity problem due to lack of appropriate resources and/or resources of a sufficient quantity to handle the attack, for example if said attack is a large attack).

In response to the request received from the client device 3 in step F10, the server device 4-3 of the protection service SP3 then notifies the client device 3 of this incapability, by transmitting thereto a "5.03 (Service Unavailable)" error message in response to its mitigation request (step F150 of FIG. 6). The "5.03 (Service Unavailable)" error message may advantageously comprise, in a "status" parameter introduced into the DOTS protocol for the purposes of the invention, the cause of the error, that is to say the reason for the incapability of the protection service SP3 (for example "status=unknown-attack" in the event of functional incapability or "status=attack-exceeded-capacity" in the event of a capacity deficiency).

By virtue of the presence of the "status" parameter enhanced in this way, the client device 3 is able to detect not only the incapability of the protection service SP3 to handle the attack ATTACK, but also determine the cause of this incapability by examining the value of the "status" parameter.

As a variant, the client device 3 may detect this incapability other than using information received directly from the server device 4-3. For example, the client device 3 may detect (directly or indirectly through information received from another entity of the computing domain 2 or by an external entity) that the computing domain 2 is still receiving attack traffic from resources protected by the protection service SP3 even though an explicit mitigation request has been sent by the client device 3 thereto, etc.

If, according to the "status" parameter of the error message, the incapability of the protection service SP2 stems from a lack of knowledge of the attack ATTACK, the client device 3 selects, from its non-volatile memory 8, one of the mitigation plans against the attack ATTACK that it has received from the other protection services involved in the handling thereof, for example the one from the protection service SP1. It then develops, based on the selected mitigation plan, a mitigation plan adapted to the resources protected by the protection service SP3.

If the resources of the computing domain 2 that are protected by the protection service SP3 are also protected by the protection service SP1 that provided the selected mitigation plan, the plan developed by the client device 3 may consist in identically adopting the selected mitigation plan, or in adopting only rules and actions corresponding to the resources protected by the protection service SP3 (assuming for example that the protection service SP1 protects other resources in addition to those protected by the protection service SP3).

If the resources of the computing domain 2 that are protected by the incapable protection service SP3 differ at least partially from the resources of the computing domain 2 that are also protected by the protection service SP1 that provided the selected mitigation plan, the client device 3 adapts the mitigation plan provided by the protection service SP1 so that it is applied to the resources protected by the protection service SP3. This adaptation may consist in particular in adapting the rules defining the characteristics of the handled traffic. For example, if the selected mitigation plan contains IP addresses protected only by the protection service SP1, while the protection service SP3 protects interconnection resources for interconnecting with another network, the client device 3 replaces these addresses with those protected by the protection service SP3.

Tables 6 and 7 illustrate one example of an adaptation that may be performed by the client device 3 to develop, based on the mitigation plan provided by the protection service SP1, a mitigation plan intended for the protection service SP3.

Table 6 below proposes, by way of illustration, one example of a mitigation plan mplanvx(SP1,mid=12332) implemented and provided by the protection service SP1.

TABLE 6

```
"mplan" {
    "ace": [
        {
            "matches": {
                "ipv4": {
                    "destination-ipv4- network": "1.2.3.0/24",
                    "source-ipv4-network": "192.0.2.0/24"
                }
            }
            "actions": {
                "forwarding": "drop"
            }
        }
    ]
}
```

Table 7 shows, in bold, the adaptation performed by the client device 3 to develop a mitigation plan adapted to the protection service SP3 (change in the identification of the resources targeted by the attack).

TABLE 7

```
"mplan" {
    "ace": [
        {
            "matches": {
                "ipv4": {
                    "destination-ipv4-network": "11.22.0.0/24",
                    "source- ipv4-network": "192.0.2.0/24"
                }
            },
            "actions": {
                "forwarding": "drop"
            }
        }
    ]
}
```

Other types of modification may be contemplated so as to be consistent with the context of a mitigation.

It should be noted that the client device 3, in order to develop a mitigation plan for the protection service SP3, may select any of the mitigation plans obtained from the protection services (randomly, the first one provided, etc.), aggregate the various plans received, or, as a variant, take into account a predetermined selection criterion, such as for example the mitigation plan that requires the least adaptation in order to be suitable for the incapable protection service.

Once the mitigation plan intended for the protection service SP3 has been developed, the client device 3 transmits it to the protection service SP3, and more particularly to the server device 4-3 of the protection service SP3, for example in a "Request Mitigation" DOTS mitigation request as described above comprising the developed mitigation plan.

The server device 4-3 may then use the mitigation plan, directly or by adapting it, to handle the attack ATTACK. Before implementing its mitigation plan, it preferably sends the version of the mitigation plan that it intends to implement to the client device 3, so that the latter checks its compatibility with the other mitigation plans implemented against the attack ATTACK. The steps described above for performing this check, and where applicable adjusting the mitigation plan proposed by the protection service 4-3 in the event of incompatibility, are then executed by the client device 3 and by the server device 4-3.

If the "status" parameter of the error message reveals a capacity deficiency of the protection service SP3, upon receipt of the error message transmitted by the server device 4-3, the client device 3 may interrogate at least one other protection service from among the protection services protecting resources of the computing domain 2 (for example the protection service SP1 here) in order to determine whether it is able to provide capacity assistance to the protection service SP3 to handle the attack ATTACK, for example by sending a DOTS assistance request thereto. It should be noted that such a request does not exist in the current version of the DOTS protocol and needs to be defined for the purposes of the invention.

The body of this assistance request may comprise the following attributes:
- an attribute, called "type" here, allowing the client device 3 to specify the urgency of the requested assistance, specifically whether the requested assistance should be provided immediately or with a delay; and
- an attribute, called "required_capacity" here, allowing the client device 3 to specify the minimum capacity resources required to provide assistance to the incapable protection service SP3 (in particular the number and the nature of the resources required).

This list of attributes is in no way exhaustive or limiting per se. Other attributes may be contemplated as a variant or in addition to the abovementioned attributes.

Upon receipt of such an assistance request by the server device 4-1, the latter checks whether the protection service SP1 has the necessary capacity for implementing the requested assistance. If this is the case and if the protection service SP1 agrees to provide this assistance, the server device 4-1 responds to the client device 3 with a "2.01 Created" DOTS response message, in which it includes information for implementing the assistance that the protection service SP1 proposes to provide. In particular, in the embodiment described here, an attribute, called for example "Scrubbing_Endpoint(s)", is included in the body of the response message and contains the IP address or addresses (or the one or more domain names) of the one or more entities with which the server device 4-3 is able to establish communication to benefit from the assistance provided by the protection service SP3 to resolve the attack ATTACK. Such an entity is for example a scrubbing center of the protection service SP1 that is responsible for filtering all or some of the suspicious traffic that reaches it.

Other information may be included in the response, such as for example a capacity available at the level of the protection service providing its assistance, one or more security keys intended to be used during this assistance (for example within the framework of a secure communication tunnel established between the incapable protection service and the protection service providing its assistance), a lifespan of the assistance provided by the protection service, etc.

Upon receipt of the information provided by the protection service SP1 declaring itself able to provide assistance to the protection service SP3 incapable of handling the attack, the client device 3 stores said information in its non-volatile memory 8. It should be noted that, depending on the lifespan associated, where applicable, with the assistance offered by the protection service, this information is intended to be used to manage the attack ATTACK and provide assistance to the protection service SP3 incapable of managing the attack ATTACK, but also later on for this same protection service or another one, if necessary.

The client device 3 then develops a mitigation plan intended for the protection service SP3 using the assistance of the protection service SP1 and transmits the mitigation plan thus developed to the server device 4-3. This mitigation plan comprises in particular the information provided by the protection service SP1 to establish communication between the protection service SP3 and the protection service SP1 in order to allow it to benefit from the assistance of the protection service SP1 to handle the attack ATTACK.

As described above, upon receipt of this mitigation plan, the server device 4-3 then implements, in response to the attack ATTACK, a mitigation plan for mitigating this attack using the assistance offered by the protection service SP1. This mitigation plan consists in particular in establishing communication that may be secure (for example a secure tunnel) with the one or more entities of the protection service SP1 identified in the information provided in the mitigation plan ("scrubbing center" of the protection service SP1) and in redirecting, via the communication thus established, all or some of the suspicious traffic (that is to say data suspected of being associated with the attack) to the scrubbing center of the protection service SP1 for handling or filtering.

Suspicious traffic redirected and routed to the protection service SP1 is then handled thereby. Traffic considered to be legitimate may be returned to the protection service SP3 or routed directly to the computing domain 2 by the protection service SP1.

As described above, the server device 4-3 may preferably send, before its actual implementation, the version of the mitigation plan that it intends to implement to the client device 3, so that it checks its compatibility with the other mitigation plans implemented against the attack ATTACK. The steps described above for performing this check, and where applicable adjusting the mitigation plan proposed by the protection service 4-3 in the event of incompatibility, are then executed by the client device 3 and by the server device 4-3.

The invention thus offers an effective solution, managed by the computing domain 2, for resolving attacks targeting the resources of the computing domain 2, based on a plurality of protection services. It is preferably applied, but without limitation, when these protection services are managed by distinct administrative entities, each of these entities having no visibility (that is to say no knowledge) of the mitigation actions implemented by the other entities.

Although the present disclosure has been described with reference to one or more examples, workers skilled in the art will recognize that changes may be made in form and detail without departing from the scope of the disclosure and/or the appended claims.

The invention claimed is:

1. A coordination method, implemented by a device managing resources of a computing domain, said resources being protected by a plurality of cyber attack protection services, said method comprising:
   obtaining mitigation plans implemented by some protection services of said plurality of protection services in response to a cyber attack targeting at least one of said resources of the computing domain; and,
   following detection of at least one incompatibility between some of the obtained mitigation plans, coordinating an adjustment of all or some of the incompatible mitigation plans with the protection services that implemented the incompatible mitigation plans, so as to eliminate said at least one incompatibility.

2. The method as claimed in claim 1, wherein the coordinating comprises:
   sending, to at least one protection service that implemented an incompatible mitigation plan, a request to adjust this incompatible mitigation plan, said request comprising at least one item of information characterizing said detected incompatibility;
   after obtaining at least one adjusted mitigation plan, checking its compatibility with the other obtained mitigation plans;
   the sending and checking being reiterated for as long as there is still an incompatibility between some obtained mitigation plans.

3. The method as claimed in claim 2, wherein said at least one protection service to which the adjustment request is sent is selected according to an effectiveness of the mitigation plan implemented by said at least one protection service.

4. The method as claimed in claim 2, wherein the adjustment request is sent to all of the protection services that implemented said incompatible mitigation plans.

5. The method as claimed in claim 2, wherein said at least one item of information contained in the adjustment request sent to a protection service comprises at least one reference to a rule of the mitigation plan implemented by this protection service at the origin of the detected incompatibility.

6. The method as claimed in claim 1, wherein said detected incompatibility causes a routing loop created by applying the incompatible mitigation plans.

7. The method as claimed in claim 1, furthermore comprising:
   detecting an update to at least one of the obtained mitigation plans; and
   checking a compatibility of said update with the other obtained mitigation plans.

8. The method as claimed in claim 7, wherein the detecting the update comprises the device sending, to at least one protection service that implemented a mitigation plan against the attack, a message checking whether an update to this mitigation plan has been performed.

9. The method as claimed in claim 8, wherein said message is sent regularly to said at least one protection service.

10. The method as claimed in claim 7, wherein, in the detecting, the device is informed of an update to a mitigation plan at an initiative of the protection service that performed said update.

11. The method as claimed in claim 1, furthermore comprising:
   determining an incapability of a protection service of said plurality of protection services to handle said cyber attack;
   developing a mitigation plan for mitigating said attack based on:
      one of the obtained mitigation plans; and/or
      assistance provided by at least one protection service of said plurality of protection services; and
   transmitting the developed mitigation plan to the protection service exhibiting said incapability so as to allow it to handle said attack.

12. A mitigation method, performed by a first protection service device of a plurality of cyber attack protection service devices protecting resources of a computing domain, said method comprising:
   implementing a mitigation plan against a cyber attack targeting at least one of said resources of the computing domain; and
   following detection, by a managing device managing said resources of the computing domain, of at least one incompatibility between said mitigation plan and at least one other mitigation plan implemented against said cyber attack by a second protection service device of said plurality of protection service devices:
      adjusting the mitigation plan implemented by the first protection service device in order to eliminate the incompatibility; and
      sending the adjusted mitigation plan to the managing device managing the resources of the computing domain.

13. The mitigation method as claimed in claim 12, wherein the first protection service device implements the adjusted mitigation plan following checking, by the managing device managing the resources of the computing domain, that the adjusted mitigation plan is compatible with other mitigation plans implemented against said attack.

14. The mitigation method as claimed in claim 12, comprising:
   updating the mitigation plan implemented by the first protection service device; and
   notifying said update to the managing device managing the resources of the computing domain in order to check a compatibility of said updated mitigation plan with other mitigation plans implemented against said attack.

15. A device managing resources of a computing domain, configured so as to communicate with a plurality of cyber attack protection services protecting said resources of the computing domain, said device comprising:
   a processor; and
   a non-transitory computer-readable recording medium on which there is recorded a computer program comprising instructions for implementing a coordination method when executed by the processor of the device, wherein the instructions configure the device to:
   obtain mitigation plans implemented by some protection services of said plurality of protection services in response to a cyber attack targeting at least one of said resources of the computing domain;
   detect existence of at least one incompatibility between some of the obtained mitigation plans; and coordinate an adjustment of all or some of the incompatible mitigation plans with the protection services that implemented the incompatible mitigation plans, so as to eliminate said at least one incompatibility.

16. A first protection service device of a plurality of cyber attack protection service devices protecting resources of a computing domain, said first protection service device comprising:

a processor; and a non-transitory computer-readable recording medium on which there is recorded a computer program comprising instructions for implementing a mitigation method when executed by the processor, wherein the instructions configure the first protection service device to:

implement a mitigation plan against an attack targeting at least one of said resources of the computing domain;

following an incompatibility, detected by a managing device managing said resources of the computing domain, between said mitigation plan and at least one other mitigation plan implemented against said cyber attack by a second protection service device of said plurality of protection service devices, adjusting the mitigation plan implemented by the first protection service device in order to eliminate said incompatibility, and sending the adjusted mitigation plan to the managing device managing the resources of the computing domain.

\* \* \* \* \*